UNITED STATES PATENT OFFICE.

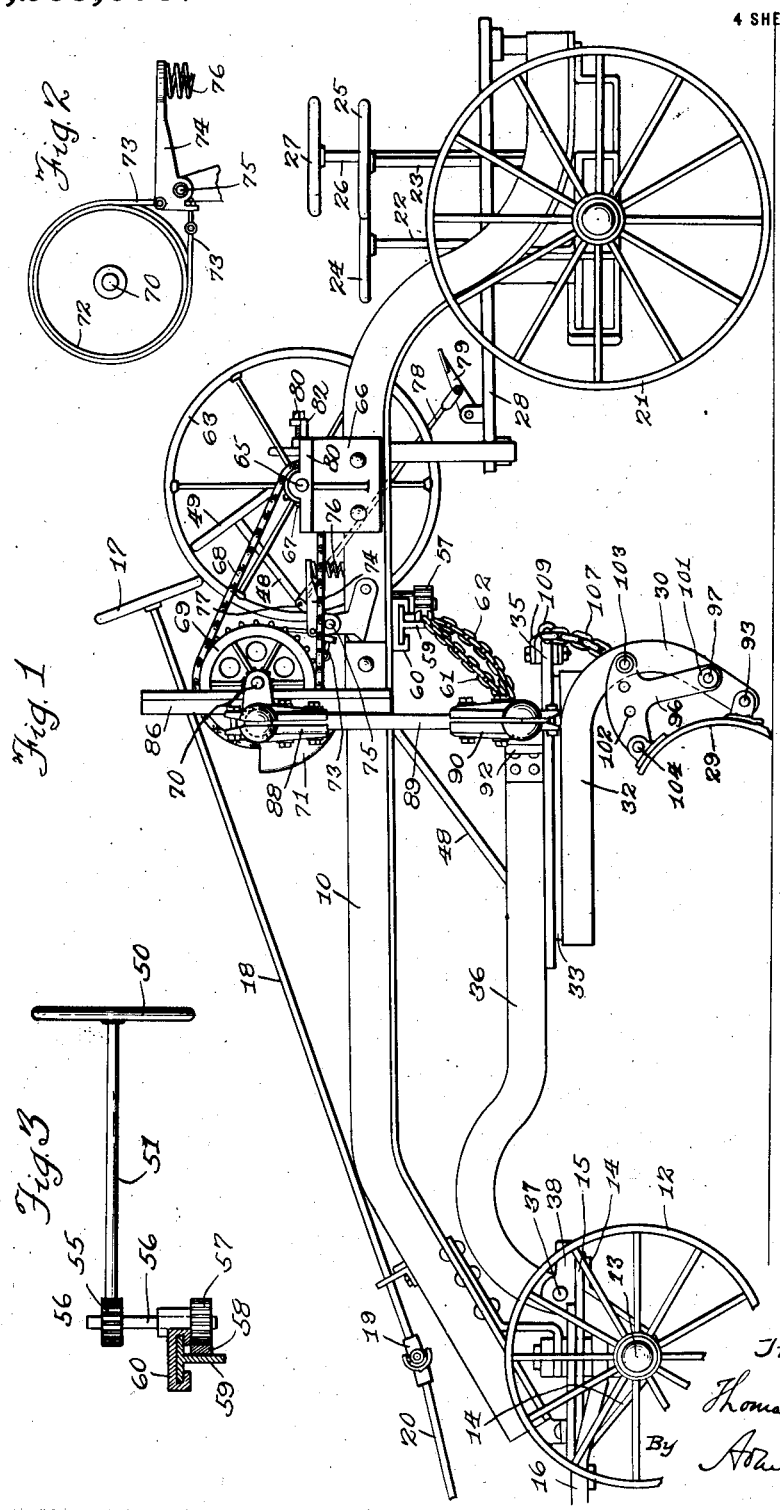

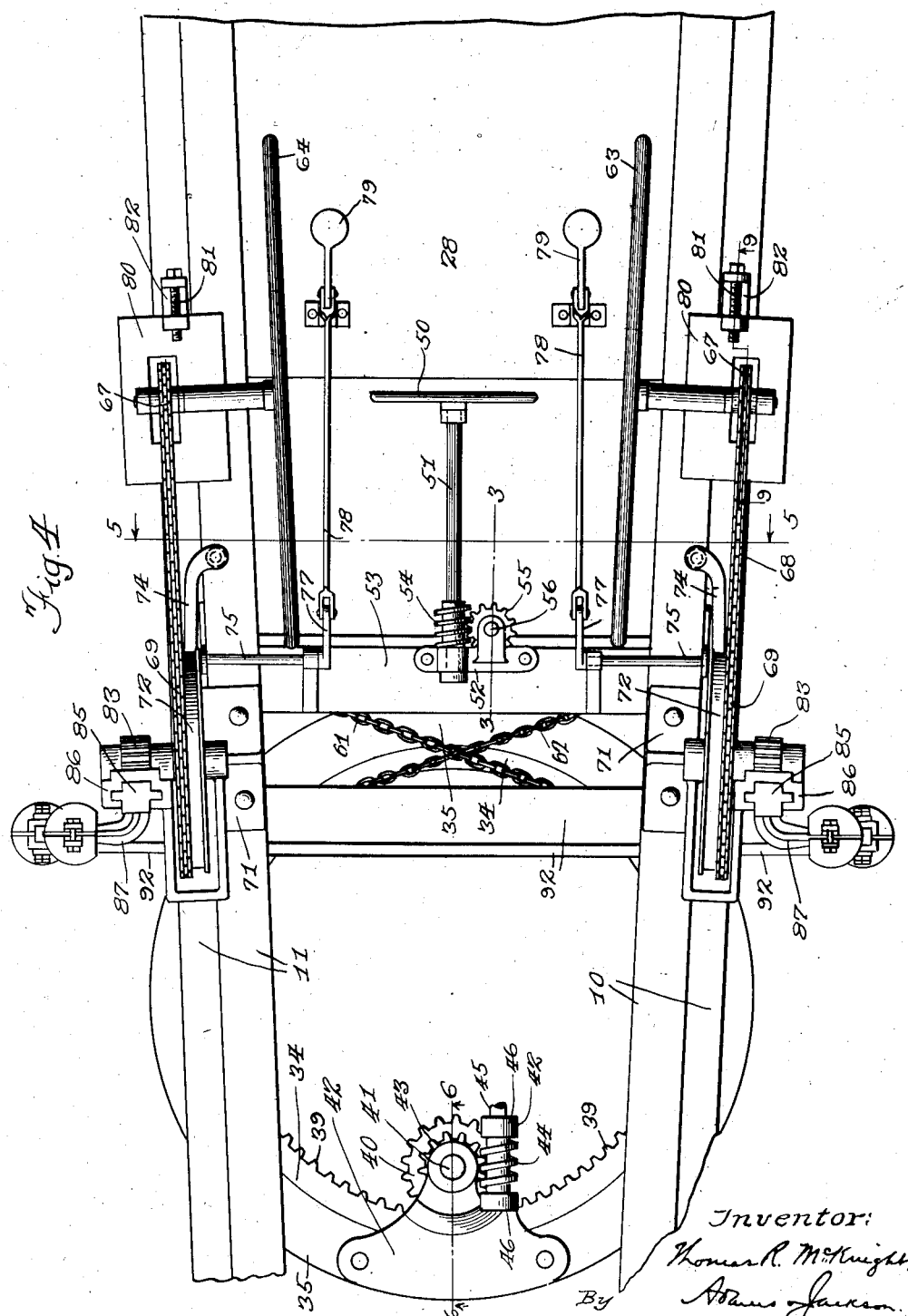

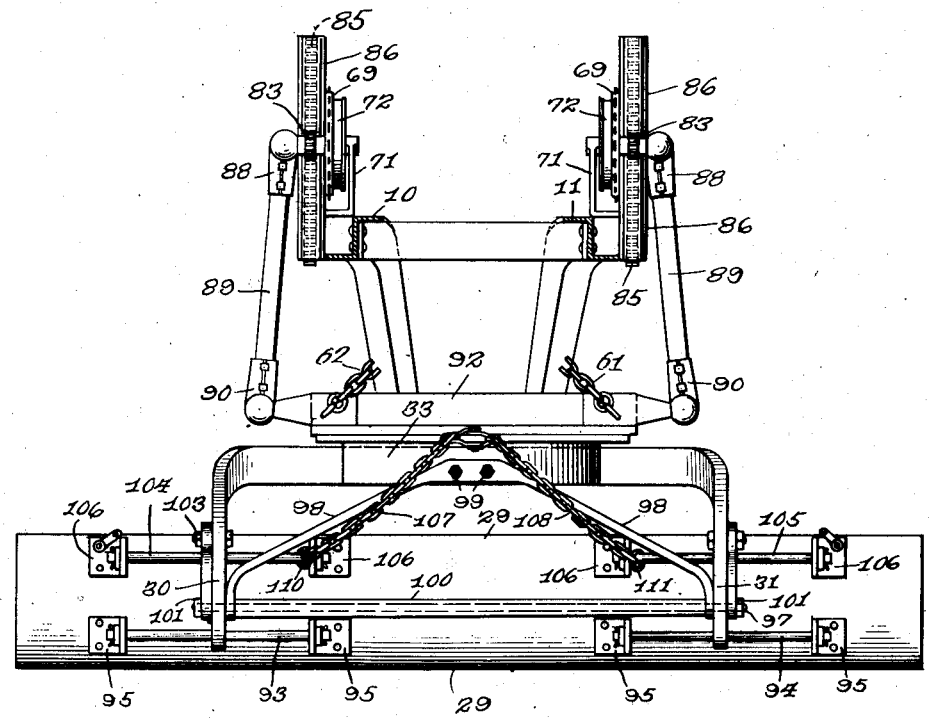
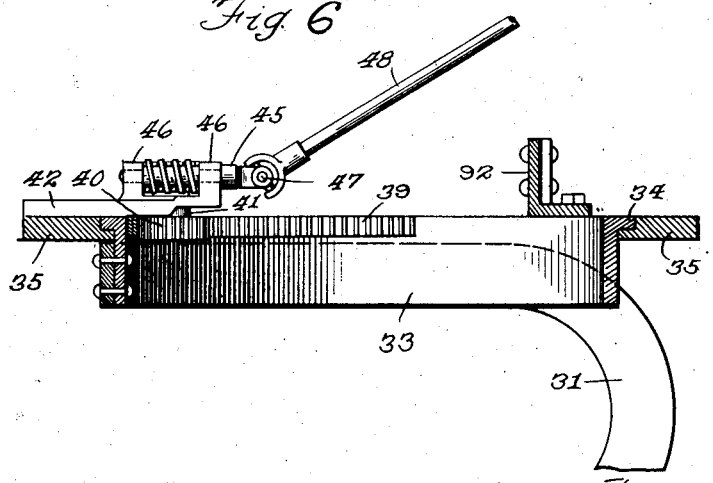

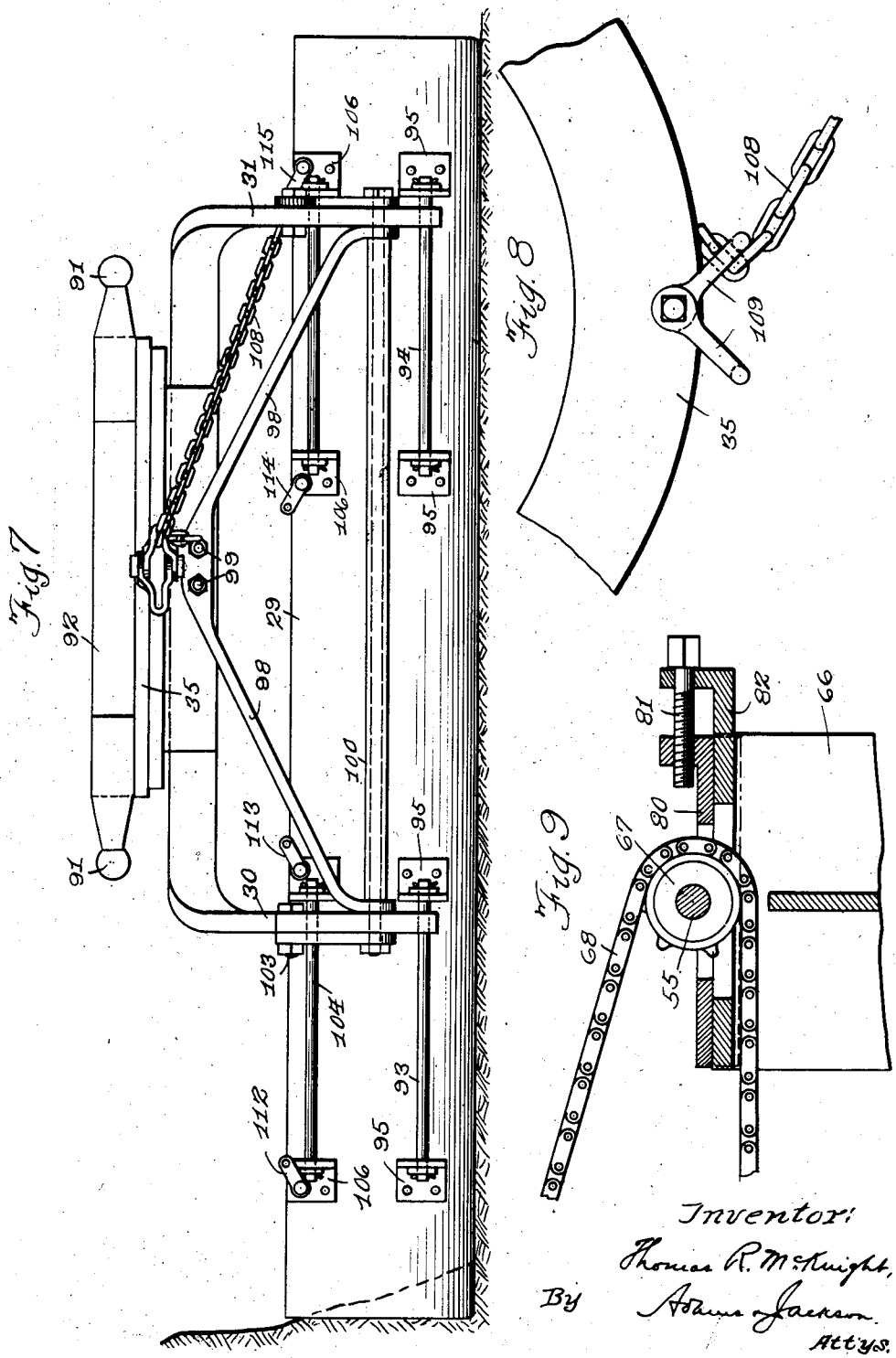

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

GRADING-MACHINE.

1,265,099.　　　　　Specification of Letters Patent.　　Patented May 7, 1918.

Application filed June 9, 1915. Serial No. 33,026.

*To all whom it may concern:*

Be it known that I, THOMAS R. McKNIGHT, a citizen of the United States, and a resident of Aurora, in the county of Kane and State of Illinois, have invented certain new and useful Improvements in Grading-Machines, of which the following is a specification, reference being had to the accompanying drawings.

My invention relates to grading-machines of the type in which a scraper-blade is suspended intermediately under a wheeled carriage and is arranged to be adjusted to vary its angular relation to the line of draft, and also to raise or lower one or both of its ends. The object of my invention is to provide certain improvements in machines of this character, such improvements relating principally to the mounting of the scraper-blade so that it can be moved endwise upon its support so as to project to a greater or less distance at either side of the machine; to the provision of means for automatically effecting such projection of the scraper-blade when its angular position with reference to the line of draft is altered; to the mechanism for raising and lowering one or both ends of the scraper-blade; to the mechanism for angularly adjusting the scraper-blade; and to the mounting of the scraper-blade so that its pitch may readily be varied. I accomplish my object as illustrated in the drawings and as hereinafter described. What I believe to be new is set forth in the claims.

In the accompanying drawings,—

Figure 1 is a side elevation of my improved grading machine;

Fig. 2 is a detail, being a side view illustrating one of the brakes for the blade raising and lowering mechanism;

Fig. 3 is a detail, being a longitudinal vertical section on line 3—3 of Fig. 4;

Fig. 4 is an enlarged detail, being a plan view of the central portion of the machine with certain parts removed;

Fig. 5 is a vertical cross-section substantially on line 5—5 of Fig. 4, certain parts being omitted;

Fig. 6 is a partial longitudinal vertical section substantially on line 6—6 of Fig. 4, showing the connections for supporting and angularly adjusting the scraper-blade;

Fig. 7 is an enlarged detail illustrating the manner in which the scraper-blade is mounted on its supports and is adjusted endwise to cause it to project to one side or the other of the machine;

Fig. 8 is an enlarged detail showing the attaching device for the upper end of one of the chains used to project the scraper-blade endwise; and Fig. 9 is a detail showing the manner of maintaining the proper tension on the chain by which the blade is raised and lowered.

Referring to the drawings,—

10—11 indicate the side-bars of the main frame of the carriage, which are preferably Z-shaped in cross-section, as shown in Fig. 5. Said side-bars are spaced a suitable distance apart and are connected by braces so as to make a strong rigid frame. The end portions of said bars are curved downward so that the intermediate portion of the carriage frame is higher than the end portions thereof, as shown in Fig. 1. 12 indicates the front wheels, which are mounted upon spindles carried by the front axle 13, which is connected in any suitable way, as by a bolster 14, with the lower member 15 of a fifth wheel. 16 indicates a draft-bar connected with the front axle and arranged to pivotally support the rear end of the tongue (not shown). 17 indicates a steering-wheel, which is mounted on the rear end of an inclined shaft 18 so as to be in a convenient position for manipulation by the operator. Said shaft extends to a point near the front of the machine and is connected by a universal joint 19 with a shaft 20 having suitable connections with the front axle, so that by rotating the steering-wheel 17 in one direction or the other the wheels may be turned to one side or the other. The connections between the shaft 20 and the front wheels are not shown herein, as they are illustrated and described in my pending application Serial No. 852,010.

21 indicates the rear wheels, which are preferably mounted on axles adapted to be projected laterally and also to be swung about a vertical axis to direct the rear wheels toward one side or the other of the machine. I prefer to employ for this purpose the construction shown and described in my said pending application, but any other suitable construction may be used. In the construction shown, 22—23 indicate vertical shafts carrying hand-wheels 24—25, respectively, for extending the two axle members laterally, and 26 indicates a shaft carrying a hand-wheel 27 for swinging the rear axles about a vertical axis to direct the rear wheels toward one side or the other of the machine.

28 indicates a platform upon which the operator stands, said platform being suitably supported at the rear of the machine as shown in Fig. 1.

29 indicates the scraper-blade, which normally extends transversely of the machine and is arranged under the central portion thereof, as shown in Fig. 1. Said blade is connected to downwardly-curved arms 30—31 of a bifurcated frame 32, the intermediate portion of which is curved and secured to a ring 33 which is provided with a marginal flange 34 by which it is suspended from an annular plate 35 carried by a bifurcated scraper-supporting frame 36, as best shown in Figs. 1 and 6. The forward end of this scraper-supporting frame is connected by a pivot 37 with a member 38 of the fifth wheel. By this construction by rotating the ring 33 upon its support, the angular position of the scraper-blade 29 with relation to the line of draft may be varied. For the purpose of swinging said ring 33, it is provided at its upper margin with a rack 39 with which meshes a pinion 40 mounted upon the lower end of a shaft 41 journaled in suitable bearings in a plate 42 secured to the support 35. Said shaft also carries a worm-wheel 43 with which meshes a worm 44 carried by a shaft 45, the latter shaft being journaled in suitable bearings 46 with which the plate 42 is provided. The shaft 45 is connected by a universal joint 47 with a shaft 48 at the upper end of which is a hand-wheel 49, as best shown in Fig. 1. By rotating this hand-wheel, the angular position of the scraper-blade with reference to the line of draft may be accordingly varied at pleasure. The rear end of the scraper-supporting frame 36 may be swung to one side or the other of the machine, for which purpose I provide a hand-wheel 50 mounted upon a substantially-horizontal shaft 51 journaled in a suitable bearing in a bracket 52 mounted on a cross-bar 53, as shown in Fig. 4,—said cross-bar being secured to the side-members 10—11 of the frame. The shaft 51 carries a worm 54, which meshes with a worm-wheel 55 mounted on a vertical shaft 56, the lower end of which is provided with a pinion 57 meshing with a rack 58 carried by a transversely-disposed bar 59, preferably in the form of a T-bar, as shown in Fig. 3. This T-bar is arranged to move transversely of the machine frame in the C-shaped guide-bar 60 shown in Figs. 1 and 3, so that by rotating the hand-wheel 50 said T-bar 59 may be moved endwise across the machine in either direction. The end portions of said bar 59 are connected by chains 61—62, or other suitable connections, with the opposite side portions of the scraper-supporting frame. That is to say, said chains are crossed so that the right-hand end of the bar 59 is connected with the left-hand side of the scraper-supporting frame, and the left-hand end of said bar is connected with the right-hand side of said scraper-supporting frame. Thus, when the bar 59 is moved to the left, it will carry the scraper-supporting frame in that direction, and vice versa. These connections, however, do not interfere with the raising and lowering of the scraper-supporting frame.

Either side of the scraper-supporting frame, or both sides simultaneously, may be raised and lowered to raise and lower the scraper-blade, or tilt it so that one end is higher than the other, by means of suitable lifting mechanism mounted on the carriage. This lifting mechanism, as shown in Fig. 4, comprises two hand-wheels 63—64 mounted at opposite sides of the carriage. Inasmuch as these hand-wheels and their connections are alike, it will suffice to describe the lifting devices at one side of the machine, it being understood that those at the other side are similar in construction and operation. As shown in Fig. 1, the hand-wheel 63 is mounted upon a shaft 65 journaled in suitable bearings provided in a standard or other suitable support 66. The shaft 65 carries a sprocket-wheel 67, which is connected by a chain 68 with a sprocket-wheel 69 mounted on a shaft 70 which is journaled in a suitable bearing provided in a standard 71 mounted at one side of the carriage, as best shown in Fig. 5. Also mounted on the shaft 70, and preferably formed integral with the sprocket-wheel 69, is a brake-wheel 72 over which passes a band-brake 73 operated by a lever 74 mounted on a shaft 75 mounted in any suitable support. The lever 74 is normally pressed upward by a spring 76 so as to hold the band 73 in braking engagement with the brake-wheel 72. The shaft 75 of the brake-lever 74 is extended laterally as shown in Fig. 4 and is provided at its inner end with a crank 77 which is connected by means of a connecting-rod 78 with a foot-lever 79 mounted on the platform 28 near one side thereof. The arrangement is such that by pressing down the foot-lever 79 the shaft 75 will be rocked to compress the spring 76 and release the brake-wheel 72, thereby permitting the sprocket-wheel 69 to rotate. In order to maintain the proper tension on the chain 68, the bearings of the shaft 65 are not mounted directly on the standard 66 but are mounted on a sliding-plate 80 connected by a screw 81 with a bracket 82 carried at the top of the standard 66, so that by rotating the screw 81 the position of the plate 80 may be adjusted back and forth and the tension of the chain 68 maintained at the desired point.

The shaft 70 upon which the sprocket-wheel 69 is mounted is provided with a pinion 83, as shown in Fig. 4, which pinion meshes with a rack 85 indicated by dotted lines in Fig. 5 and shown in plan view in Fig. 4. This rack is mounted in a vertical position in a housing 86 which incloses it at three sides, a small opening being provided through which the pinion 83 engages said rack. The housing is so shaped as to form a bearing for the rack 85 so that said rack may slide vertically freely and smoothly. Obviously, as the shaft 70 is mounted in stationary bearings, when said shaft rotates the pinion 83 will cause the rack to move up or down, depending on the direction of rotation of said pinion. 87 indicates an arm, which projects from the rack 85 at the side opposite that engaged by the pinion 83 and is bent so as to project laterally in the manner shown in Fig. 4. Said arm carries a globular bearing or ball at its outer end to receive a socket-bearing 88 which is carried at the upper end of a suspending-bar 89. The lower end of said bar 89 also carries a socket-bearing 90 which fits upon a ball 91 carried at one end of a cross-bar 92 which extends transversely of and is secured to the rear portion of the scraper-supporting frame 36. Preferably, said cross-bar 92 is secured to the ring-plate 35, as shown in Figs. 6 and 7. As has been explained, the connections at the other side of the machine are the same as those described, so that it will be apparent that the scraper-supporting frame is suspended from the two racks 85, and by operating the hand-wheels 63—64 similarly said scraper-supporting frame may be raised and lowered in a level position, or, by operating one or the other of said hand-wheels alone, the scraper-supporting frame may be rocked about its longitudinal axis to raise or lower one end of the scraper more than the other. By providing the ball joints at the upper and lower ends of the suspending-bars 89, the desired adjustments can be made without cramping the parts, and, besides, the scraper-supporting frame is capable of swinging laterally or back and forth independently of the rack-bars 85. The brakes controlling the sprocket-wheels 69 are normally set, so that as soon as the foot-levers 79 are released the scraper is locked in any position into which it may have been adjusted.

The scraper-blade is connected near its lower margin with the downwardly-curved arms 30—31 by rods 93—94 which are parallel with the edge of the scraper and are secured thereto near its opposite ends and adjacent to its lower edge by brackets 95, as best shown in Figs. 5 and 7. The lower ends of the arms 30—31 are perforated to receive these rods 93—94, said rods being arranged to slide endwise through the arms 30—31 when the scraper-blade is adjusted endwise with relation thereto. When the scraper is in a central position with reference to the scraper-supporting frame, the arms 30—31 occupy an intermediate position upon the rods 93—94, but as shown in Fig. 7, the scraper-blade may be moved endwise so as to project a considerable distance farther at either side of the scraper-supporting frame than at the other, thus enabling the machine to be used to operate against a bank which would otherwise be out of reach. Another important advantage obtained by providing for shifting the blade endwise while in an angular position, is that the cutting end of the blade may thereby be brought nearer the line of draft, to prevent the machine from sliding sidewise when doing hard digging.

The scraper-blade is held at the proper pitch meanwhile permitting its endwise adjustment by means of T-shaped arms 96 which are pivotally connected at their lower ends with the scraper supporting arms 30—31, in the construction shown said arms 96 being pivoted upon a rod 97 mounted in bars 98 which are secured to the rear of the ring 33, as shown at 99 in Fig. 5, and diverge rearwardly and downwardly to points in line with the lower end portions of the arms 30—31, against which they abut, as shown in Fig. 5. The rod 97 passes through suitable eyes in the lower ends of said bars 98, and also through registering eyes in the arms 30—31 and through bearings in the lower ends of the arms 96. A sleeve 100 is fitted upon the rod 97 between the lower ends of the bars 98, as shown in Fig. 5, to hold the lower ends of said bars properly apart. Nuts 101 are screwed upon the ends of the rod 97 to hold the arms 96 thereupon, as shown in Figs. 1 and 5. The upper portions of the arms 96 are provided with holes 102 through which bolts 103 pass, said bolts serving to adjustably connect the rear upper portions of the arms 96 with intermediate portions of the downwardly-curved arms 30—31, as shown in Fig. 1. The front upper portions of the arms 96 are connected with the upper marginal portion of the blade 29 by rods 104—105, which are secured to the scraper blade 29 by brackets 106 similar to the brackets 95. The rods 104—105 are arranged parallel with the rods 93—94 and are placed near the upper margin of the scraper-blade opposite the bars 93—94, respectively. Said rods 104—105 are adapted to slide through suitable holes in the arms 96 when the scraper-blade is moved endwise in the manner previously described. Thus, the arms 96 firmly brace the upper marginal portion of the scraper-blade, regardless of whether it occupies an intermediate position with reference to the scraper-supporting frame or is projected at one side or the other thereof, and as said arms are secured at separated points to the scraper supporting arms 30—31, and have a lateral bearing against said arms, they are always held perpendicular to the scraper blade, thereby avoiding danger of cramping and insuring free endwise movement thereof when it is adjusted.

107—108 indicate chains, which are connected near their upper ends with the rear portion of the scraper-supporting frame, preferably by links 109 attached to the plate 35, as shown in Fig. 8,—the lower ends of said chains being connected with the scraper at opposite sides of the center thereof, as by links 110—111 which embrace the rods 104—105, as shown in Fig. 5. When the scraper is in its intermediate position, the links 110—111 are adjacent to the inner ends of said rods, as shown. It will be apparent that if the ring 33 is swung around to change the angular relation of the scraper-blade to the line of draft, inasmuch as the plate 35 does not turn with it and the upper ends of the chains 107—108 are connected to such plate, one of said chains will act to pull back on the end of the scraper which is swung forward, thus causing the rearwardly-swinging end of the scraper to be projected at that side of the machine.

The extent of such projection with a given degree of swinging of the blade may be varied by allowing more or less slack in the chains 107—108, as, obviously, if there is considerable slack in said chains they will not begin to move the scraper endwise until it has swung through a greater arc. Instead of connecting the chains 107—108 by means of links 110—111 with the rods 104—105, as shown in Fig. 5, the scraper may be provided with links or clevises 112—113—114—115 placed at suitable points near its upper margin and adapted to be connected with one or the other of the chains 107—108. By providing these links, or equivalent devices, a greater range of endwise movement may be obtained, since by removing one of the chains 107—108 and connecting the other chain to the outermost clevis, the scraper-blade may move endwise to an extent limited only by the length of the rods 104—105, as illustrated in Fig. 7. When the blade is extended in the manner described, it may be raised on a level or at either end by means of the lifting devices, or the scraper-supporting frame may be swung to one side or the other so that the machine may conveniently be adjusted to meet a variety of conditions.

It will be understood that my invention is not restricted to the specific details of the construction shown and described, except in so far as they are particularly claimed, as my invention includes generically the subject-matter of the broader claims.

That which I claim as my invention, and desire to secure by Letters Patent, is,—

1. A grading-machine, comprising a wheeled carriage, a scraper support connected therewith, a scraper, means connecting said scraper with said support and permitting endwise movement of said scraper and mechanism for moving said scraper endwise in a substantially horizontal plane.

2. A grading-machine, comprising a wheeled carriage, a scraper support connected therewith, a scraper, means connecting said scraper with said support and permitting endwise movement of said scraper, and mechanism mounted on the carriage for moving said scraper endwise in a substantially horizontal plane.

3. A grading-machine, comprising a wheeled carriage, a laterally-swinging scraper-supporting frame connected therewith, a scraper, means connecting said scraper with said frame and permitting endwise movement of said scraper, and mechanism for moving said scraper endwise in a substantially horizontal plane.

4. A grading-machine, comprising a wheeled carriage, a rotary scraper-support, a scraper mounted on said support and movable longitudinally of itself independently thereof, and means for rotating said support and for simultaneously moving the scraper longitudinally of itself.

5. A grading-machine, comprising a wheeled carriage, a scraper-support, a scraper carried thereby and movable longitudinally of itself in a substantially horizontal plane, and means mounted on the carriage for moving said scraper longitudinally upon said support.

6. A grading machine, comprising a wheeled carriage, a rotary scraper support, laterally swinging means connecting said scraper support with said carriage, a scraper mounted on said support and movable longitudinally of itself in a substantially horizontal plane independently of said support, and means mounted on the carriage for moving said scraper longitudinally.

7. A grading-machine, comprising a wheeled carriage, a scraper-supporting frame pivotally connected with said carriage so as to swing laterally, means for vertically adjusting said frame, a scraper mounted on said frame and movable endwise independently thereof, and means mounted on the carriage for moving said scraper endwise in a substantially horizontal plane.

8. A grading-machine, comprising a wheeled carriage, a scraper-supporting frame pivotally connected with said carriage so as to swing laterally, an angularly-adjustable scraper mounted on said frame and movable endwise independently thereof, and means operated by angular adjustment of said scraper for moving the same endwise.

9. A grading machine, comprising a wheeled carriage, a scraper supporting frame connected with the carriage, a member supported by said scraper supporting frame, an endwise movable scraper connected with said member, said member being adapted to swing to vary the angular position of the scraper with reference to the line of draft, and means operated by the swinging of said member for moving the scraper endwise.

10. A grading-machine, comprising a wheeled carriage, a scraper-supporting frame connected with the carriage, a member supported by said scraper-supporting frame, a scraper connected with said member, said member being adapted to swing to vary the angular position of the scraper with reference to the line of draft, and means automatically governed by the swinging of said member for moving the scraper longitudinally to cause one end of said scraper to project laterally a greater or less distance.

11. A grading-machine, comprising a wheeled carriage, a scraper-supporting frame connected therewith and having a non-rotary ring-plate, a rotary ring-plate supported by said non-rotary ring-plate, a member connected with said rotary ring-plate and having depending arms, a scraper supported by said arms and movable longitudinally independently thereof, and means for moving said scraper longitudinally of itself in a substantially horizontal plane.

12. A grading machine, comprising a wheeled carriage, a scraper-supporting frame connected therewith and having a non-rotary ring-plate, a rotary ring-plate supported by said non-rotary ring-plate, a member connected with said rotary ring-plate and having depending arms, a scraper supported by said arms and movable longitudinally independently thereof, and means for automatically moving said scraper longitudinally when said member is swung to vary the angular position of the scraper with reference to the line of draft.

13. A grading-machine, comprising a wheeled carriage, a scraper supporting frame connected to the carriage, a member supported by said frame and adapted to swing to vary its angular position to the line of draft, a scraper mounted on said member and movable longitudinally of itself independently of said member, and a flexible connection connected with the scraper-supporting frame and with opposite end portions of the scraper for automatically moving the scraper endwise of itself when said member is swung to vary the angular position of the scraper to the line of draft.

14. A grading machine, comprising a wheeled carriage, a scraper support connected therewith, means for adjusting said scraper support vertically, a scraper, means connecting said scraper with said support and permitting endwise movement of said scraper, and means independent of the operation of said adjusting means for adjusting said scraper endwise.

15. A grading machine, comprising a wheeled carriage, a laterally swinging scraper-supporting frame connected therewith, means for moving said scraper-supporting frame vertically, a scraper, means connecting said scraper with said frame and permitting endwise movement of said scraper, of mechanism independent of the operation of the means for moving said frame vertically for moving said scraper endwise.

16. A grading-machine, comprising a wheeled carriage, a scraper-supporting frame pivotally connected with the carriage and adapted to swing laterally, a scraper carried by said scraper-supporting frame, means mounted on the carriage for raising and lowering the rear end portion of said scraper-supporting frame, means mounted on the carriage for changing the angular position of the scraper with reference to the line of draft, and means operated by angular adjustment of said scraper for moving the scraper endwise.

17. A grading-machine, comprising a wheeled carriage, a scraper-supporting frame connected therewith and having a non-rotary annular plate, a rotary ring supported by said non-rotary plate, scraper-supporting means connected with said rotary ring, and means for rotating said ring, comprising a worm mounted on said non-rotary ring, a worm-wheel meshing with said worm, a pinion operatively connected with said worm-wheel, an internal rack carried by said rotary ring and meshing with said pinion, and a shaft connected with said worm for rotating the same.

18. A grading machine, comprising a wheeled carriage, a scraper-supporting frame connected with said wheeled carriage, scraper-supporting arms connected to said frame, a scraper having rods extending longitudinally thereof, certain of said rods having sliding engagement with said arms, and members pivotally mounted upon said scraper-supporting arms and adjustably secured in fixed relation thereto at points removed from their pivots, said members having sliding engagement with certain of said rods.

19. A grading machine, comprising a wheeled carriage, a scraper-supporting frame connected with said carriage, scraper-supporting arms connected to said frame, a scraper having rods extending longitudinally thereof, certain of said rods having sliding engagement with said arms, members pivotally mounted upon said scraper-supporting arms and bearing laterally thereagainst, said members being adjustably secured at points removed from their pivots in fixed relation to said arms, said members having sliding engagement with certain of said rods.

20. A grading machine, comprising a wheeled carriage, a scraper-supporting frame connected with said carriage, scraper-supporting arms connected to said frame, a scraper having rods extending longitudinally thereof, certain of said rods having sliding engagement with said arms, and T shaped arms pivotally mounted upon said scraper-supporting arms and adjustably secured in fixed relation thereto at points removed from their pivots, certain of the rods carried by said scraper having sliding engagement with said T shaped arms.

THOMAS R. McKNIGHT.

Witnesses:
WILLIAM D. FOULKE,
M. J. INGRAM.